United States Patent
Beck et al.

(10) Patent No.: US 9,182,014 B2
(45) Date of Patent: Nov. 10, 2015

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/396,069

(22) PCT Filed: Mar. 13, 2013

(86) PCT No.: PCT/EP2013/055066
§ 371 (c)(1),
(2) Date: Oct. 22, 2014

(87) PCT Pub. No.: WO2013/159996
PCT Pub. Date: Oct. 31, 2013

(65) Prior Publication Data
US 2015/0087471 A1 Mar. 26, 2015

(30) Foreign Application Priority Data
Apr. 25, 2012 (DE) .......... 10 2012 206 808

(51) Int. Cl.
*F16H 3/66* (2006.01)
*F16H 3/44* (2006.01)

(52) U.S. Cl.
CPC ............ *F16H 3/66* (2013.01); *F16H 2003/445* (2013.01); *F16H 2200/0065* (2013.01);
(Continued)

(58) Field of Classification Search
CPC .............. F16H 3/66; F16H 2200/2094; F16H 2003/445; F16H 2200/0065; F16H 2200/0082; F16H 2200/2012; F16H 2200/2046
See application file for complete search history.

(56) References Cited

U.S. PATENT DOCUMENTS 3,999,448 A 12/1976 Murakami et al.
4,395,925 A 8/1983 Gaus
(Continued)

FOREIGN PATENT DOCUMENTS

DE 29 36 969 A1 4/1981
DE 199 12 480 A1 9/2000
(Continued)

OTHER PUBLICATIONS

German Search Report Corresponding to 10 2012 206 808.2 mailed Nov. 13, 2012.
(Continued)

*Primary Examiner* — Derek D Knight
(74) *Attorney, Agent, or Firm* — Davis & Bujold, P.L.L.C.; Michael J. Bujold

(57) ABSTRACT

Nine gear transmission with four planetary gear sets, rotatable shafts and six shift elements. Sun of first set is connected to fifth shaft connected to sun of second set and is couplable to housing by third brake. Drive shaft is releasably connected by first clutch to fourth shaft connected to carrier of second set and is couplable by second brake to housing. Drive shaft is connectable by of second clutch to seventh shaft connected to ring of second set and sun of third set and is connectable by of third clutch to eighth shaft connected to ring of fourth set and carrier of third set. Shaft (6) is connected to ring of third set and carrier of first, and third shaft is connected to sun of fourth set and is couplable by first brake to housing. Output shaft is connected to carrier of fourth set and ring of first set.

16 Claims, 1 Drawing Sheet

(52) U.S. Cl.
CPC . *F16H2200/0082* (2013.01); *F16H 2200/2012* (2013.01); *F16H 2200/2046* (2013.01); *F16H 2200/2094* (2013.01)

(56) References Cited

U.S. PATENT DOCUMENTS

| | | | |
|---|---|---|---|
| 6,572,507 | B1 | 6/2003 | Korkmaz et al. |
| 6,960,149 | B2 | 11/2005 | Ziemer |
| 7,549,942 | B2 | 6/2009 | Gumpoltsberger |
| 7,695,398 | B2 | 4/2010 | Phillips et al. |
| 7,699,743 | B2 | 4/2010 | Diosi et al. |
| 8,210,981 | B2 | 7/2012 | Bauknecht et al. |
| 8,210,982 | B2 | 7/2012 | Gumpoltsberger et al. |
| 8,398,522 | B2 | 3/2013 | Bauknecht et al. |
| 2009/0197734 | A1 | 8/2009 | Phillips et al. |
| 2009/0209389 | A1 | 8/2009 | Phillips et al. |
| 2015/0119187 | A1* | 4/2015 | Beck et al. .................. 475/276 |

FOREIGN PATENT DOCUMENTS

| | | |
|---|---|---|
| DE | 101 15 995 A1 | 10/2002 |
| DE | 10 2005 010 210 A1 | 9/2006 |
| DE | 10 2006 006 637 A1 | 9/2007 |
| DE | 10 2008 031 970 A1 | 1/2009 |
| DE | 10 2008 000 428 A1 | 9/2009 |
| DE | 10 2008 000 429 A1 | 9/2009 |
| DE | 10 2008 041 195 A1 | 2/2010 |
| DE | 10 2009 019 046 A1 | 11/2010 |
| DE | 10 2009 020 442 A1 | 11/2010 |
| DE | 10 2009 028 670 A1 | 2/2011 |
| JP | 2005-98433 A | 4/2005 |
| JP | 2005-172123 A | 6/2005 |
| JP | 2006-349153 A | 12/2006 |

OTHER PUBLICATIONS

German Search Report Corresponding to 10 2012 206 773.6 mailed Nov. 13, 2012.
German Search Report Corresponding to 10 2012 206 774.4 mailed Nov. 13, 2012.
German Search Report Corresponding to 10 2012 206 778.7 mailed Nov. 13, 2012.
German Search Report Corresponding to 10 2012 206 782.5 mailed Nov. 13, 2012.
German Search Report Corresponding to 10 2012 206 792.2 mailed Nov. 13, 2012.
German Search Report Corresponding to 10 2012 206 809.0 mailed Nov. 13, 2012.
German Search Report Corresponding to 10 2012 206 817.1 mailed Nov. 13, 2012.
German Search Report Corresponding to 10 2012 206 819.8 mailed Nov. 13, 2012.
International Search Report Corresponding to PCT/EP2013/055066 mailed May 21, 2013.
International Search Report Corresponding to PCT/EP2013/055083 mailed May 21, 2013.
International Search Report Corresponding to PCT/EP2013/055079 mailed May 21, 2013.
International Search Report Corresponding to PCT/EP2013/055068 mailed May 22, 2013.
International Search Report Corresponding to PCT/EP2013/055081 mailed May 22, 2013.
International Search Report Corresponding to PCT/EP2013/055070 mailed May 21, 2013.
International Search Report Corresponding to PCT/EP2013/055077 mailed May 21, 2013.
International Search Report Corresponding to PCT/EP2013/055071 mailed May 21, 2013.
International Search Report Corresponding to PCT/EP2013/055076 mailed May 21, 2013.
Written Opinion Corresponding to PCT/EP2013/055066 mailed May 21, 2013.

* cited by examiner

| GEAR | ENGAGED SHIFT ELEMENT | | | | | | GEAR RATIO | GEAR INTERVAL |
|---|---|---|---|---|---|---|---|---|
| | BRAKE | | | CLUTCH | | | | |
| | 03 | 04 | 05 | 14 | 17 | 18 | i | φ |
| 1 | x | | x | | x | | 3.857 | 1.519 |
| 2 | x | | x | x | | | 2.538 | 1.374 |
| 3 | x | | | x | x | | 1.847 | 1.324 |
| 4 | x | | | | x | x | 1.395 | 1.395 |
| 5 | | | | x | x | x | 1.000 | 1.238 |
| 6 | | | x | x | | x | 0.808 | 1.176 |
| 7 | | | x | | x | x | 0.687 | 1.287 |
| 8 | | x | x | | | x | 0.534 | 1.245 |
| 9 | | x | | | x | x | 0.429 | TOTAL |
| R | x | x | | | x | | -3.522 | 8.993 |
| M | x | x | | | | x | 1.395 | |
| M | x | | | x | | x | 1.395 | |
| M | x | | x | | | x | 1.395 | |

MULTI-SPEED GEARBOX

This application is a National Stage completion of PCT/EP2013/055066 filed Mar. 13, 2013, which claims priority from German patent application serial no. 10 2012 206 808.2 filed Apr. 25, 2012.

FIELD OF THE INVENTION

The present invention relates to a multi-stage transmission of a planetary design, in particular an automatic transmission for a motor vehicle.

BACKGROUND OF THE INVENTION

According to the prior art, automatic transmissions, particularly for motor vehicles, comprise planetary gear sets which are shifted using friction elements or shift elements such as clutches and brakes, and typically are connected to a start-up element, such as a hydrodynamic torque converter or a fluid coupling, which is subject to a slip effect and is provided optionally with a lock-up clutch.

Such an automatic transmission is known, for example, from DE 199 12 480 B4 by the applicant. It comprises three single-carrier planetary gear sets, as well as three brakes and two clutches for shifting six forward gears and one reverse gear, an input shaft and an output shaft, wherein the carrier for the first planetary gear set is continuously connected to the ring gear of the second planetary gear set, and the carrier for the second planetary gear set is continuously connected to the ring gear of the third planetary gear set, and the input shaft is directly connected to the sun gear of the second planetary gear set.

Furthermore, in the known transmission, the input shaft is connectable, by means of the first clutch, to the sun gear of the first planetary gear set and, by means of the second clutch, to the carrier of the first planetary set, wherein the sun gear of the first planetary gear set is connectable, by means of the first brake, to a housing of the transmission, and the carrier of the first planetary gear set is connectable, by means of the second brake, to the housing of the transmission, wherein the sun gear of the third planetary gear set is connectable, by means of the third brake, to the housing of the transmission. The output shaft of the transmission is continuously connected to the carrier for the third planetary gear set and the ring gear of the first planetary gear set.

Furthermore, a 9-speed multi-stage transmission is known from DE 29 36 969 A1; it comprises eight shift elements and four planetary gear sets, wherein one planetary gear set serves as a front-mounted transmission and the main gearing includes a Simpson set and a further planetary gear set serving as a reverse gearing.

Further multistage transmissions are known, for example, from the applicant's DE 10 2005 010 210 A1 and DE 10 2006 006 637 A1.

Automatically shiftable vehicle transmissions, of a planetary design, are already generally described numerous times in the prior art and are continually undergoing further development and improvement. These transmissions should have a relatively simple design, in particular requiring a low number of shift elements, and avoid the need for double shifting when sequential shifting is performed, i.e., activation and deactivation of two shift elements, thereby ensuring that only one shift element is ever switched when shifting is performed in defined groups of gears.

DE 10 2008 000 428 A1, by the applicant, discloses a multi-stage transmission of a planetary design, which includes an input drive and an output drive, which are disposed in a housing. With the known transmission, at least four planetary gear sets, hereinafter termed the first, second, third and fourth planetary gear sets, at least eight rotatable shafts, hereinafter termed the drive shaft, output shaft, third, fourth, fifth, sixth, seventh and eighth shafts, as well as at least six shaft elements comprising brakes and clutches are provided, the selective engagement of which generates different transmission ratios between the drive shaft and the output shaft such that preferably nine forward gears and one reverse gear are feasible.

The first and second planetary gear sets, which are preferably designed as minus planetary gear sets, i.e., with a negative stationary transmission, form a shiftable front-mounted gear set, wherein the third and fourth planetary gear sets form a main gear set.

In the known multi-stage transmission, the carriers of the first and second planetary gear sets are coupled together, via the fourth shaft, which is connected to an element of the main gear set, the ring gear of the first planetary gear set is coupled to the sun gear of the second planetary gear set, via the eighth shaft, which is detachably connectable to the drive shaft via the first clutch, and the sun gear of the first planetary gear set can be coupled to a housing of the transmission by means of the third shaft, via a first brake, and is detachably connectable to the drive shaft, via a second clutch, wherein the ring gear of the second planetary gear set can be coupled to a housing of the transmission by means of the fifth shaft, via a second brake. In addition, the seventh shaft is permanently connected to at least one element of the main gear set, and can be coupled to the housing of the transmission via a third brake, and the sixth shaft is permanently connected to at least one further element of the main gear set and is detachably connectable to the drive shaft, via a third clutch; the output shaft is permanently connected at least to one further element of the main gear set.

In the known transmission, the fourth shaft is preferably permanently connected to the ring gear of the third planetary gear set, the sixth shaft is permanently connected to the ring gear of the fourth planetary gear set and to the carrier of the third planetary gear set, and is detachably connectable to the drive shaft, via the third clutch. Furthermore, the seventh shaft is permanently connected to the sun gears of the third and fourth planetary gear sets, and can be coupled to a housing of the transmission, via the third brake. In this case, the output drive is produced via the output shaft, which is permanently connected to the carrier of the fourth planetary gear set. Furthermore, the third and fourth planetary gear sets can be combined or reduced to a Ravigneaux set having a common carrier and a common ring gear.

According to the prior art, the shift elements of a multistage transmission designed in this manner, which are normally designed as multi-disk clutches or brakes, are hydraulically actuated, which disadvantageously leads to high hydraulic losses. To circumvent this actuation loss, it would be particularly advantageous to use shift elements which can be actuated as needed.

Shift elements which can be actuated as needed can be understood, in particular, as shift elements that require no or comparatively little energy to maintain the gear state, i.e., disengaged or engaged, over changing the gear state.

To enable the use of shift elements that can be actuated as needed, the shift elements, in particular the clutches, must be easily accessible from the outside.

SUMMARY OF THE INVENTION

The object of the present invention is to propose a multistage transmission of the initially-cited type, which has nine forward gears and one reverse gear having a sufficient transmission ratio, in which the design complexity, the component stress and construction size are optimized, and efficiency is furthermore improved. In addition, the shift elements of the transmission should be readily accessible from the outside, which enables the installation of shift elements which can be actuated as needed. Furthermore, the transmission should be suitable for both a standard design and front-transverse design.

Accordingly, a multi-stage transmission, according to the invention, of a planetary design is proposed which has an input shaft and an output shaft and is disposed in a housing. In addition, there are provided at least four planetary gear sets which are designated, in the following, as the first, second, third, and fourth planetary gear sets, eight rotatable shafts which are designated, in the following, as the drive shaft, output shaft, third, fourth, fifth, sixth, seventh, and eighth shafts, and at least six shift elements, preferably designed lamellar shift elements or form-locking shift elements, comprising brakes and clutches, whose selective engagement produces different transmission ratios between the drive shaft and the output shaft, and therefore preferably nine forward gears and one reverse gear can be realized.

The planetary gear sets of the transmission are preferably designed as minus planetary gear sets.

As is well known, a simple minus planetary gear set comprises a sun gear, a ring gear, and a carrier on which the planetary gears are rotatably carried, the planetary gears meshing with the sun gear and the ring gear. As a result, when the carrier is fixed, the ring gear has a direction of rotation which is opposite that of the sun gear. In contrast, a simple plus planetary gear set comprises a sun gear, a ring gear and a carrier, on which inner and outer planet gears are rotatably carried, wherein all inner planet gears mesh with the sun gear and all outer planet gears mesh with the ring gear, and each inner planet gear meshes with only one outer planet gear. As a result, when the carrier is fixed, the ring gear has the same direction of rotation as the sun gear, and a positive stationary transmission ratio results.

According to a preferred embodiment of the invention, the sun gear of the first planetary gear set is connected to the fifth shaft which is connected to the sun gear of the second planetary gear set and can be coupled, by means of a third brake, to the housing of the transmission, wherein the drive shaft can be releasably connected, by means of a first clutch, to the fourth shaft which is connected to the carrier of the second planetary gear set and can be coupled, by means of a second brake, to the housing of the transmission. Furthermore, the drive shaft is releasably connectable, by means of a second clutch, to the seventh shaft, which is connected to the ring gear of the second planetary gear set and the sun gear of the third planetary gear set, wherein the drive shaft is furthermore releasably connectable, by means of a third clutch, to the eighth shaft, which is connected to the ring gear of the fourth planetary gear set and the carrier of the third planetary gear set.

Furthermore, the sixth shaft of the transmission is connected to the ring gear of the third planetary gear set and the carrier of the first planetary gear set, wherein the third shaft of the transmission is connected to the sun gear of the fourth planetary gear set and can be coupled to the housing, by means of a first brake, and wherein the output shaft of the transmission is connected to the carrier of the fourth planetary gear set and the ring gear of the first planetary gear set.

Because the first, second and third clutches are disposed on the drive shaft of the transmission and the additional shift elements are designed as brakes, ready accessibility of all of the transmission shift elements is achieved, which allows the shift elements to be designed as shift elements which can be actuated as needed. In the context of additional embodiments of the invention, shift elements of the transmission can be designed, inter alia, as hydraulically-actuatable shift elements.

Furthermore, transmission ratios result that are particularly suitable for passenger vehicles, and in a greater overall gear ratio of the multi-stage transmission, thereby improving driving smoothness and significantly reducing fuel consumption.

In addition, design complexity is significantly reduced with the multi-stage transmission according to the invention due to a low number of shift elements. Using the multi-stage transmission according to the invention, it is advantageously possible to perform a start-up using a hydrodynamic converter, an external start-up clutch, or any other suitable external start-up element. It is also conceivable to perform a start-up using a start-up element integrated in the transmission. Preferably, a shift element that is actuated in the first forward gear and in the reverse gear is suitable for this.

Moreover, the multi-stage transmission, according to the invention, results in good efficiency in the main drive gears with respect to drag losses and gearing losses.

Advantageously, low torques exist in the shift elements and in the planetary gear sets of the multi-stage transmission, thereby advantageously reducing wear in the multi-stage transmission. In addition, the low torques make it possible to utilize correspondingly small dimensions, thereby reducing the necessary installation space and related costs. Furthermore, the rotational speeds of the shafts, shift elements, and planetary gear sets are low.

In addition, the transmission, according to the invention, is designed to allow adaptability to different drive train embodiments in terms of power flow direction and spatial aspects.

BRIEF DESCRIPTION OF THE DRAWINGS

The invention is described in greater detail in the following, as an example, with reference to the attached Figures. They show.

DETAILED DESCRIPTION OF THE PREFERRED EMBODIMENTS

Figures 1, 2:
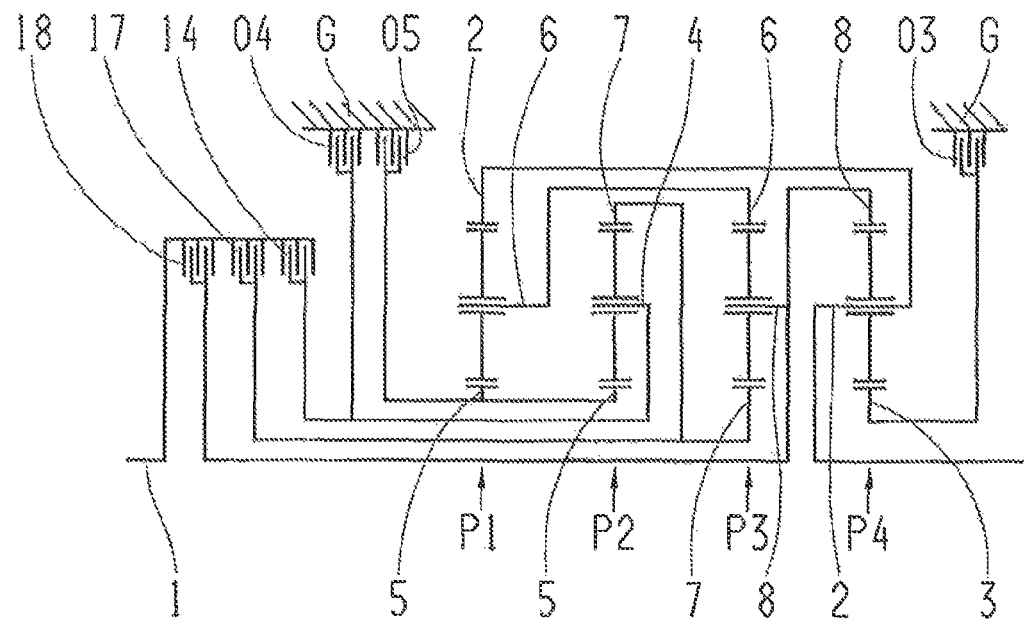
FIG. 1: A schematic view of a preferred embodiment of a multi-stage transmission according to the invention.
FIG. 2: An example of a shift pattern for a multi-stage transmission according to FIG. 1.

FIG. 1 shows a multi-stage transmission, according to the invention, which has a drive shaft 1, an output shaft 2, and four planetary gear sets P1, P2, P3 and P4 which are disposed in a housing G. Planetary gear sets P1, P2, P3 and P4, in the example shown in FIG. 1, are designed as minus planetary gear sets. According to the invention, at least one of the planetary gear sets P1, P2, P3, P4 can be designed as a plus planetary gear set if the carrier and ring gear connection are exchanged and, simultaneously, the value of the stationary transmission ratio is increased by 1 in comparison to the design as a minus planetary gear set.

Viewed axially, the planetary gear sets P1, P2, P3, P4, in the portrayed exemplary embodiment, are disposed in the sequence of the first planetary gear set P1, second planetary gear set P2, third planetary gear set P3, and fourth planetary gear P4. According to the invention, the actual sequence of individual planetary gear sets and the arrangement of the shift elements are freely selectable as permitted by the connectivity of the elements.

As shown in FIG. 1, six shift elements are provided, namely, three brakes, 03, 04, 05 and three clutches 14, 17, 18. The spatial disposition of the shift elements can be arbitrary, and is limited only by the dimensions of the outer design. The transmission's clutches and brakes are preferably designed as friction shift elements or lamellar shift elements, but they can also be designed as form-locking shift elements.

Selective shifting of nine forward gears and one reverse gear can be realized using these shift elements. The multi-stage transmission, according to the invention, has a total of eight rotatable shafts, namely, the shafts 1, 2, 3, 4, 5, 6, 7 and 8, wherein the drive shaft is the first shaft 1, and the output shaft is the second shaft 2 of the transmission.

According to the invention in the multi-stage transmission according to FIG. 1, the sun gear of the first planetary gear set P1 is connected to the fifth shaft 5 which is connected to the sun gear of the second planetary gear set P2 and can be coupled, by means of a third brake 05, to the housing G of the transmission, wherein the drive shaft 1 can be releasably connected, by means of a first clutch 14, to the fourth shaft 4 which is connected to the carrier of the second planetary gear set P2 and can be coupled, by means of a first brake 04, to the housing G. With reference to FIG. 1, the drive shaft 1 is releasably connectable, by means of a second clutch 17, to the seventh shaft 7, which is connected to the ring gear of the second planetary gear set P2 and the sun gear of the third planetary gear set P3, and is releasably connectable, by means of a third clutch 18, to the eighth shaft 8, which is connected to the ring gear of the fourth planetary gear set P4 and the carrier of the third planetary gear set P3.

As can be seen in FIG. 1, the sixth shaft 6 is connected to the ring gear of the third planetary gear set P3 and the carrier of the first planetary gear set P1, wherein the third shaft 3 is connected to the sun gear of the fourth planetary gear set P4 and can be coupled to the housing G, by means of a first brake 03, and wherein the output shaft 2 of the transmission is connected to the carrier of the fourth planetary gear set P4 and the ring gear of the first planetary gear set P1.

Viewed axially, the first, second and third clutches 14, 17, 18 can be disposed next to each other and designed as lamellar shift elements, and have a common outer clutch disc carrier. In the portrayed exemplary embodiment, the first brake 03 is particularly suitable for a design as a jaw clutch element which significantly improves usage.

FIG. 2 shows an example of a shift pattern of a multi-stage transmission according to FIG. 1. Three shift elements are engaged for every gear. The shift pattern shows, as examples, the particular transmission ratios i of the individual gear steps and, to be determined therefrom, the gear increments or step changes φ to the next higher gear, wherein the value 8.993 is the transmission ratio spread.

The values for the stationary transmission ratios of the planetary gear sets P1, P2, P3, and P4, designed as minus planetary gear sets, are −2.196, −1.925, −3.478 and −2.533, respectively. FIG. 2 shows that only one shift element must be engaged and one shift element must be disengaged when shifting sequentially, because two neighbouring gear steps jointly use two shift elements. It is also shown that a large transmission ratio spread is attained with small gear increments.

The first forward gear is attained by engaging the first and third brakes 03, 05 and the second clutch 17; the second forward gear is attained by engaging the first and third brakes 03, 05 and first clutch 14; the third forward gear is attained by engaging the first brake 03 and first and second clutches 14, 17; the fourth forward gear is attained by engaging the first brake 03 and the second and third clutches 17, 18; the fifth forward gear, which is designed as a direct gear, in the portrayed example, is attained by engaging the first, second and third clutches 14, 17, 18; the sixth forward gear is attained by engaging the third brake 05 and the first and third clutches 14, 18; the seventh forward gear is attained by engaging the third brake 05 and the second and third clutches 17, 18; the eighth forward gear is attained by engaging the second and the third brakes 04, 05 and the third clutch 18; and the ninth forward gear is attained by engaging the second brake 04 and the second and third clutches 17, 18; wherein the reverse gear is attained by engaging the first and second brakes 03, 04 and the second clutch 17.

Alternately, the fourth forward gear can be shifted by additional shifting combinations which are identified in FIG. 2 with M. Accordingly, the fourth forward gear can be attained by engaging the first and second brakes 03, 04 and the third clutch 18, or by engaging the first brake 03 and the first and third clutches 14, 18, or by engaging the first and third brakes 03, 05 and the third clutch 18.

Since the first brake 03 and the second clutch 17 are engaged in the first forward gear and in the reverse gear, these shift elements can be used as start-up elements.

The second brake 04, which is engaged in reverse gear, and/or the third brake 05, which is engaged in first gear can also be used as a startup element.

According to the invention, different gear increments also result from the same gear pattern depending on the shift logic, thereby making it possible to implement an application-specific or vehicle-specific variation.

According to the invention, it is furthermore optionally possible to provide additional freewheels at each suitable location of the multi-staged transmission, for example, between a shaft and the housing, or possibly to connect two shafts.

An axle differential and/or a distributor differential can be disposed on the drive side or on the output side.

Within the scope of an advantageous development of the invention, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element or the like. It is also possible to dispose such a start-up element in the power flow direction after the transmission wherein, in this case, the drive shaft 1 is continuously connected to the crankshaft of the drive motor.

The multi-stage transmission, according to the invention, also makes it possible to situate a torsional-vibration damper between the drive motor and the transmission.

Within the scope of a further, not depicted embodiment of the invention, a wear-free brake, for instance, a hydraulic or electric retarder or the like, can be disposed on each shaft, preferably on the drive shaft 1 or the output shaft 2 which, in particular, is of special significance for use in commercial vehicles. Furthermore, a power take-off drive can be provided on each shaft, preferably on the input shaft 1 or the output shaft 2, for driving additional assemblies.

The friction shift elements that are used can be designed as power shiftable clutches or brakes. In particular, force locking clutches or brakes can be used, for instance, lamellar clutches, band brakes, and/or cone clutches.

A further advantage of the multi-stage transmission presented here is that an electric machine can be attached to each shaft as a generator and/or as an additional drive machine.

REFERENCE SIGNS 1 first shaft, drive shaft
2 second shaft, output shaft 3 third shaft
4 fourth shaft
5 fifth shaft
6 sixth shaft
7 seventh shaft
8 eighth shaft
03 first brake
04 second brake
05 third brake
14 first clutch
17 second clutch
18 third clutch
G housing
P1 first planetary gear set
P2 second planetary gear set
P3 third planetary gear set
P4 fourth planetary gear set
i transmission ratio
φ step change

The invention claimed is:

1. A multi-stage transmission of a planetary design comprising:
a first rotatable shaft being a drive shaft (1),
a second rotatable shaft being an output shaft (2),
first, second, third and fourth planetary gear sets (P1, P2, P3, P4) which are arranged within a housing (G),
third, fourth, fifth, six, seventh and eighth rotatable shafts (3, 4, 5, 6, 7, 8), and
six shift elements (03, 04, 05, 14, 17, 18) comprising brakes (03, 04, 05) and clutches (14, 17, 18) whose selective engagement generates different transmission ratios between the drive shaft (1) and the output shaft (2) such that nine forward gears and one reverse gear are implementable,
wherein the fifth shaft (5) is connected to both the sun gear of the first planetary gear set (P1) and the sun gear of the second planetary gear set (P2) and the fifth shaft (5) can be coupled to the housing (G) by a third brake (05),
the drive shaft (1) can be releasably connected, by a first clutch (14), to the fourth shaft (4), the fourth shaft (4) is connected to the carrier of the second planetary gear set (P2) and can be coupled, by a second brake (04), to the housing (G),
the drive shaft (1) can be releasably connected, by a second clutch (17), to the seventh shaft (7) which is connected to both the ring gear of the second planetary gear set (P2) and the sun gear of the third planetary gear set (P3), and the seventh shaft (7) can be releasably connected, by a third clutch (18), to the eighth shaft (8), which is connected to the ring gear of the fourth planetary gear set (P4) and the carrier of the third planetary gear set (P3),
the sixth shaft (6) is connected to both the ring gear of the third planetary gear set (P3) and the carrier of the first planetary gear set (P1),
the third shaft (3) is connected to the sun gear of the fourth planetary gear set (P4) and can be coupled, by a first brake (03), to the housing (G), and
the output shaft (2) is connected to both the carrier of the fourth planetary gear set (P4) and the ring gear of the first planetary gear set (P1).

2. The multi-stage transmission according to claim 1, wherein each of the first, the second, the third and the fourth planetary gear sets (P1, P2, P3, P4) is designed as a minus planetary gear set.

3. The multi-stage transmission according to claim 1, wherein, when viewed axially, the planetary gear sets are disposed in the sequence of the first planetary gear set (P1), the second planetary gear set (P2), the third planetary gear set (P3), and the fourth planetary gear set (P4).

4. The multi-stage transmission according to claim 1, wherein the six shift elements (03, 04, 05, 14, 17, 18) the transmission are designed as shift elements which can be actuated, as needed.

5. The multistage transmission according to claim 1, wherein the first brake (03) is designed as a form-locking shift element.

6. The multistage transmission according to claim 1, wherein a first forward gear is attained by engaging the first and the third brakes (03, 05) and the second clutch (17);
a second forward gear is attained by engaging the first and the third brakes (03, 05) and first clutch (14);
a third forward gear is attained by engaging the first brake (03) and the first and the second clutches (14, 17);
a fourth forward gear is attained by engaging the first brake (03) and the second and the third clutches (17, 18);
a fifth forward gear is attained by engaging the first, the second and the third clutches (14, 17, 18);
a sixth forward gear is attained by engaging the third brake (05) and the first and the third clutches (14, 18);
a seventh forward gear is attained by engaging the third brake (05) and the second and the third clutches (17, 18);
an eighth forward gear is attained by engaging the second and the third brakes (04, 05) and the third clutch (18);
a ninth forward gear is attained by engaging the second brake (04) and the second and the third clutches (17, 18);
a reverse gear is attained by engaging the first and the second brakes (03, 04) and the second clutch (17).

7. The multistage transmission according to claim 1, wherein a first forward gear is attained by engaging the first and the third brakes (03, 05) and the second clutch (17);
a second forward gear is attained by engaging the first and the third brakes (03, 05) and first clutch (14);
a third forward gear is attained by engaging the first brake (03) and the first and the second clutches (14, 17);
a fourth forward gear is attained by engaging the first and the third brakes (03, 05) and the third clutch (18);
a fifth forward gear is attained by engaging the first, the second and the third clutches (14, 17, 18);
a sixth forward gear is attained by engaging the third brake (05) and the first and the third clutches (14, 18);
a seventh forward gear is attained by engaging the third brake (05) and the second and the third clutches (17, 18);
an eighth forward gear is attained by engaging the second and the third brakes (04, 05) and the third clutch (18);
a ninth forward gear is attained by engaging the second brake (04) and the second and the third clutches (17, 18);
a reverse gear is attained by engaging the first and the second brakes (03, 04) and the second clutch (17).

8. The multistage transmission according to claim 1, wherein a first forward gear is attained by engaging the first and the third brakes (03, 05) and the second clutch (17);
a second forward gear is attained by engaging the first and the third brakes (03, 05) and first clutch (14);
a third forward gear is attained by engaging the first brake (03) and the first and the second clutches (14, 17);
a fourth forward gear is attained by engaging the first and second brakes (03, 04) and the third clutch (18);
a fifth forward gear is attained by engaging the first, the second and the third clutches (14, 17, 18);
a sixth forward gear is attained by engaging the third brake (05) and the first and the third clutches (14, 18);
a seventh forward gear is attained by engaging the third brake (05) and the second and the third clutches (17, 18);

an eighth forward gear is attained by engaging the second and the third brakes (04, 05) and the third clutch (18);

a ninth forward gear is attained by engaging the second brake (04) and the second and the third clutches (17, 18);

a reverse gear is attained by engaging the first and the second brakes (03, 04) and the second clutch (17).

9. The multistage transmission according to claim 1, wherein a first forward gear is attained by engaging the first and the third brakes (03, 05) and the second clutch (17);

a second forward gear is attained by engaging the first and the third brakes (03, 05) and first clutch (14);

a third forward gear is attained by engaging the first brake (03) and the first and the second clutches (14, 17);

a fourth forward gear is attained by engaging the first brake (03) and the first and the third clutches (14, 18);

a fifth forward gear is attained by engaging the first, the second and the third clutches (14, 17, 18);

a sixth forward gear is attained by engaging the third brake (05) and the first and the third clutches (14, 18);

a seventh forward gear is attained by engaging the third brake (05) and the second and the third clutches (17, 18);

an eighth forward gear is attained by engaging the second and the third brakes (04, 05) and the third clutch (18);

a ninth forward gear is attained by engaging the second brake (04) and the second and the third clutches (17, 18);

a reverse gear is attained by engaging the first and the second brakes (03, 04) and the second clutch (17).

10. The multi-stage transmission according to claim 1, wherein the multi-stage transmission is an automatic transmission for a motor vehicle.

11. A multi-stage transmission of a planetary design comprising:

a first rotatable shaft being a drive shaft, a second rotatable shaft being an output shaft, first, second, third and fourth planetary gear sets which are arranged within a housing, third, fourth, fifth, six, seventh and eighth rotatable shafts, and six shift elements comprising brakes and clutches whose selective engagement generates different transmission ratios between the drive shaft and the output shaft such that nine forward gears and one reverse gear are implementable, wherein the fifth shaft is connected to both the sun gear of the first planetary gear set and the sun gear of the second planetary gear set and the fifth shaft can be coupled to the housing by a third brake, the drive shaft can be releasably connected, by a first clutch, to the fourth shaft, the fourth shaft is connected to the carrier of the second planetary gear set and can be coupled, by a second brake, to the housing, the drive shaft can be releasably connected, by a second clutch, to the seventh shaft which is connected to both the ring gear of the second planetary gear set and the sun gear of the third planetary gear set, and the seventh shaft can be releasably connected, by a third clutch, to the eighth shaft, which is connected to the ring gear of the fourth planetary gear set and the carrier of the third planetary gear set, the sixth shaft is connected to both the ring gear of the third planetary gear set and the carrier of the first planetary gear set, the third shaft is connected to the sun, gear of the fourth planetary gear set and can be coupled, by a first brake, to the housing, and the output shaft is only directly connected to both the carrier of the fourth planetary gear set and the ring gear of the first planetary gear set.

12. The multistage transmission according to claim 11, wherein a first forward gear is attained by engaging the first and the third brakes and the second clutch;

a second forward gear is attained by engaging the first and the third brakes and first clutch;

a third forward gear is attained by engaging the first brake and the first and the second clutches;

a fourth forward gear is attained by engaging the first brake and the second and the third clutches;

a fifth forward gear is attained by engaging the first, the second and the third clutches;

a sixth forward gear is attained by engaging the third brake and the first and the third clutches;

a seventh forward gear is attained by engaging the third brake and the second and the third clutches;

an eighth forward gear is attained by engaging the second and the third brakes and the third clutch;

a ninth forward gear is attained by engaging the second brake and the second and the third clutches;

a reverse gear is attained by engaging the first and the second brakes and the second clutch.

13. The multistage transmission according to claim 11, wherein a first forward gear is attained by engaging the first and the third brakes and the second clutch;

a second forward gear is attained by engaging the first and the third brakes and first clutch;

a third forward gear is attained by engaging the first brake and the first and the second clutches;

a fourth forward gear is attained by engaging the first and the third brakes and the third clutch;

a fifth forward gear is attained by engaging the first, the second and the third clutches;

a sixth forward gear is attained by engaging the third brake and the first and the third clutches;

a seventh forward gear is attained by engaging the third brake and the second and the third clutches;

an eighth forward gear is attained by engaging the second and the third brakes and the third clutch;

a ninth forward gear is attained by engaging the second brake and the second and the third clutches;

a reverse gear is attained by engaging the first and the second brakes and the second clutch.

14. The multistage transmission according to claim 11, wherein a first forward gear is attained by engaging the first and the third brakes and the second clutch;

a second forward gear is attained by engaging the first and the third brakes and first clutch;

a third forward gear is attained by engaging the first brake and the first and the second clutches;

a fourth forward gear is attained by engaging the first and second brakes and the third clutch;

a fifth forward gear is attained by engaging the first, the second and the third clutches;

a sixth forward gear is attained by engaging the third brake and the first and the third clutches;

a seventh forward gear is attained by engaging the third brake and the second and the third clutches;

an eighth forward gear is attained by engaging the second and the third brakes and the third clutch;

a ninth forward gear is attained by engaging the second brake and the second and the third clutches;

a reverse gear is attained by engaging the first and the second brakes and the second clutch.

15. The multistage transmission according to claim 11, wherein a first forward gear is attained by engaging the first and the third brakes and the second clutch;
- a second forward gear is attained by engaging the first and the third brakes and first clutch;
- a third forward gear is attained by engaging the first brake and the first and the second clutches;
- a fourth forward gear is attained by engaging the first brake and the first and the third clutches;
- a fifth forward gear is attained by engaging the first, the second and the third clutches;
- a sixth forward gear is attained by engaging the third brake and the first and the third clutches;
- a seventh forward gear is attained by engaging the third brake and the second and the third clutches;
- an eighth forward gear is attained by engaging the second and the third brakes and the third clutch;
- a ninth forward gear is attained by engaging the second brake (04) and the second and the third clutches;
- a reverse gear is attained by engaging the first and the second brakes and the second clutch.

16. The multi-stage transmission according to claim 11, wherein the multi-stage transmission is an automatic transmission for a motor vehicle.

\* \* \* \* \*